(12) United States Patent
Park et al.

(10) Patent No.: US 10,025,414 B2
(45) Date of Patent: Jul. 17, 2018

(54) TILED DISPLAY DEVICE AND SYNCHRONIZING METHOD THEREOF

(71) Applicant: Samsung Display Co., Ltd., Yongin-si (KR)

(72) Inventors: Dong-Won Park, Hwaseong-si (KR); Bong Hyun You, Yongin-si (KR); Nam-Gon Choi, Yongin-si (KR); Seok Ha Hong, Yongin-si (KR); Jung-Won Kim, Seoul (KR); Dong Gyu Lee, Seoul (KR); Jae Hyun Cho, Seoul (KR); Jae Hyung Cho, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 381 days.

(21) Appl. No.: 14/847,546

(22) Filed: Sep. 8, 2015

(65) Prior Publication Data

US 2016/0266704 A1 Sep. 15, 2016

(30) Foreign Application Priority Data

Mar. 11, 2015 (KR) .................. 10-2015-0033906

(51) Int. Cl.
*G06F 3/041* (2006.01)
*G06F 3/14* (2006.01)

(52) U.S. Cl.
CPC .......... *G06F 3/0416* (2013.01); *G06F 3/1446* (2013.01); *G09G 2370/16* (2013.01)

(58) Field of Classification Search
CPC .... G06F 3/0412; G06F 3/0416; G06F 3/1446; G09G 2370/16
See application file for complete search history.

(56) References Cited

U.S. PATENT DOCUMENTS

| 9,047,042 | B2* | 6/2015 | Sharma | .................. H04L 67/10 |
| 2005/0259084 | A1* | 11/2005 | Popovich | ............ G06F 3/04886 345/173 |
| 2007/0087686 | A1* | 4/2007 | Holm | ........................ H04S 7/30 455/3.06 |

(Continued)

FOREIGN PATENT DOCUMENTS

| KR | 10-2011-0029979 | 3/2011 |
| KR | 10-2012-0068048 | 6/2012 |

(Continued)

*Primary Examiner* — Amare Mengistu
*Assistant Examiner* — Crystal A Mathews
(74) *Attorney, Agent, or Firm* — H.C. Park & Associates, PLC (57) ABSTRACT

A tiled display device includes a first display device including a first display panel configured to sense a touch thereon and display an image signal, and a first controller configured to control the first display panel and transmit a reference signal wirelessly, and a second display device including a second display panel configured to sense a touch thereon and display the image signal, and a second controller configured to control the second display panel and transmit a first ACK signal to the first controller after receiving the reference signal, in which the first controller is configured to determine a first latency time of the second display device by using the reference signal and the first ACK signal and synchronize touch information of the first and second display devices according to the first latency time.

10 Claims, 4 Drawing Sheets

(56) References Cited

U.S. PATENT DOCUMENTS

| | | | |
|---|---|---|---|
| 2007/0124503 A1* | 5/2007 | Ramos | G06F 3/017 709/248 |
| 2009/0096711 A1* | 4/2009 | Jang | G06F 3/1446 345/1.3 |
| 2010/0144283 A1* | 6/2010 | Curcio | G06F 1/1626 455/66.1 |
| 2012/0162158 A1 | 6/2012 | Choi et al. | |
| 2012/0207215 A1 | 8/2012 | Ryu et al. | |
| 2013/0083240 A1* | 4/2013 | Kerr | G06F 3/1446 348/383 |
| 2013/0241801 A1* | 9/2013 | Petrik | G06F 3/1423 345/1.1 |
| 2013/0285957 A1 | 10/2013 | Kim et al. | |
| 2014/0125697 A1 | 5/2014 | Suito | |
| 2014/0204104 A1 | 7/2014 | Jang et al. | |

FOREIGN PATENT DOCUMENTS

| | | |
|---|---|---|
| KR | 10-2012-0074961 | 7/2012 |
| KR | 10-2013-0120708 | 11/2013 |
| KR | 10-2014-0039312 | 4/2014 |

\* cited by examiner

TILED DISPLAY DEVICE AND SYNCHRONIZING METHOD THEREOF

CROSS-REFERENCE TO RELATED APPLICATION

This application claims priority from and the benefit of Korean Patent Application No. 10-2015-0033906, filed on Mar. 11, 2015, which is hereby incorporated by reference for all purposes as if fully set forth herein.

BACKGROUND

Field

Exemplary embodiments of the present invention relate to a tiled display device and a synchronization method thereof.

Discussion of the Background

Display devices, such as liquid crystal displays (LCD), organic light emitting diode (OLED) displays, and electrophoretic displays typically include a field generating electrode and an electro-optical active layer. For example, the OLED display device includes a liquid crystal layer as the electro-optical active layer. The field generating electrode may be connected to a switching element such as a thin-film transistor to receive a data signal, and the electro-optical active layer may convert the data signal into an optical signal to display an image.

When a heavy and fragile glass substrate is used as a display panel for the display device, there may be a limit to portability and the size of the screen display. Accordingly, a flexible display device using a plastic substrate, which is light, strong against an impact, and flexible, has been researched as a substrate of a display panel.

A display device may have a touch detecting function that may be interactive with a user, in addition to an image displaying function. The touch detection function may recognize touch information, such as whether an object approaches or touches the screen, and a position of the touch, by detecting, through the display device, a change in pressure applied to the screen, charges, light, and the like, when a user uses a finger or a touch pen to approach or touch a screen and writes a letter or draws a picture on the screen. The display device may receive an image signal based on the touch information and display an image.

The touch detecting function may be implemented through a touch detecting sensor. The touch detecting sensor may be classified based on various types, such as a resistive type, a capacitive type, an electro-magnetic (EM) type, and an optical type.

In the resistive type touch detecting sensor, two electrodes, which face each other and are spaced apart from each other, may be in contact with each other by pressure from an external object. When the two electrodes are in contact with each other, the touch detecting sensor may recognize a touch position and the like by recognizing a change in a voltage, according to a resistance change at the position of the contact.

The capacitive type touch detecting sensor may include a detection capacitor formed of detecting electrodes that may transmit a detection signal, and recognize whether a touch is generated, a touch position, and the like by detecting a change in charged capacitance or a change in an amount of charged charges of the detection capacitor generated, when a conductor, such as a finger, approaches the touch detecting sensor. The capacitive type touch detecting sensor includes touch electrodes disposed in a touch detecting region and signal transmitting wires connected with the touch electrodes. The signal transmitting wires may transmit a touch input signal to the touch electrode, or a detection output signal of the touch electrode generated according to the touch to a detection signal controller.

A tiled display device may be formed by disposing display devices, and the display devices may display the same content image, or each display device may display different content from each other. In the tiled display device, synchronization between the display devices may be important.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a synchronized tiled display device and a method of synchronizing a tiled display device.

Additional aspects will be set forth in the detailed description which follows, and, in part, will be apparent from the disclosure, or may be learned by practice of the inventive concept.

According to an exemplary embodiment of the present invention, a tiled display device includes, a first display device including a first display panel configured to sense a touch thereon and display an image signal and a first controller configured to control the first display panel and transmit a reference signal wirelessly, and a second display device including a second display panel configured to sense a touch thereon and display the image signal and a second controller configured to control the second display panel and transmit a first ACK signal to the first controller after receiving the reference signal, in which the first controller is configured to determine a first latency time of the second display device by using the reference signal and the first ACK signal and synchronize a touch information of the first and second display devices according to the first latency time.

According to an exemplary embodiment of the present invention, a method for synchronizing a tiled display device including display devices, the tiled display device configured to display an image signal in connection with the display devices, includes categorizing the display devices into a master display device and a slave display device, transmitting a reference signal through a wireless interface by the master display device to the slave display device, receiving an ACK signal as a response for the reference signal from the slave display device through the wireless interface, determining a latency time of the slave display device by using the reference signal and the ACK signal, and synchronizing the touch information of the master display device and the touch information of the slave display device by using the latency time.

According to an exemplary embodiment of the present invention, a method for synchronizing a tiled display device including first, second, and third display devices and displaying an image signal in connection with the first, second, and third display devices, includes receiving a first interrupt signal from the second display device, when a first touch signal is detected in the second display device, receiving a second interrupt signal from the third display device, when a second touch signal is detected in the third display device, receiving a first end signal from the second display device, when the first touch signal has ended, receiving a second end signal from the third display device, when the second touch signal has ended, and displaying an image corresponding to the first and second touch signals when receiving the first end signal and the second end signal.

According to exemplary embodiments of the present invention, touch information between the display devices of the tiled display device are synchronized with each other, and an image signal corresponding to the touch information may be simultaneously displayed in each display device.

According to exemplary embodiments of the present invention, performing a display operation after receiving touch information of all display devices of the tiled display device, the touch information of each display device may be synchronized.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
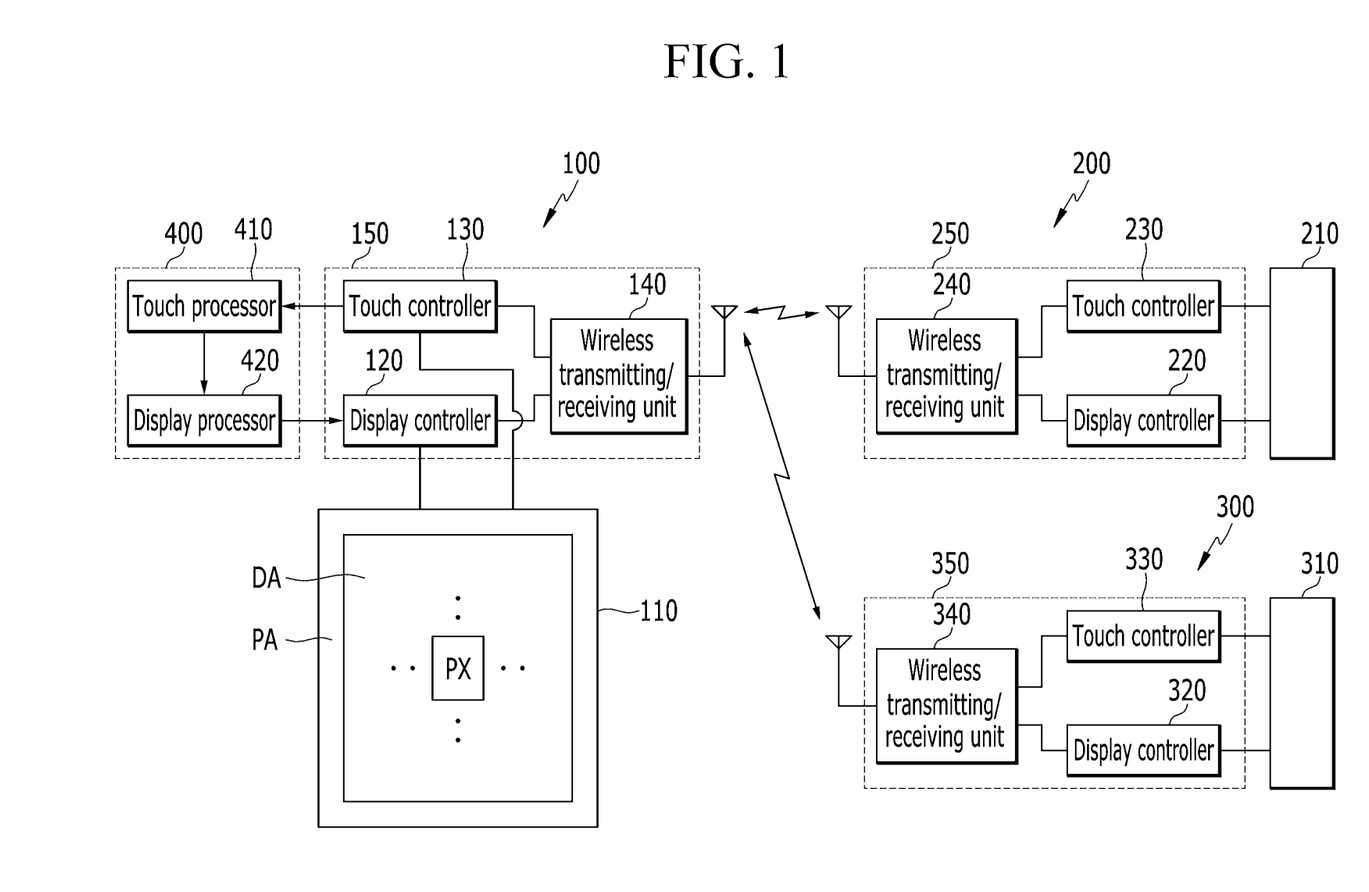
FIG. 1 is a view showing a tiled display device according to an exemplary embodiment of the present invention.

FIG. 1 is a view of a tiled display device according to an exemplary embodiment of the present invention.

As shown in FIG. 1, a tiled display device according to the present exemplary embodiment includes a first display device 100, a second display device 200, a third display device 300, and a set board 400. In FIG. 1, for convenience of the description, the tiled display device includes three display devices 100, 200, and 300, however, the tiled display device may include at least two display devices.

The first to third display devices 100, 200, and 300 may be linked with each other, such that different content images may be respectively displayed or the same content images may be divided and displayed. The first to third display devices 100, 200, and 300 are linked to each other, such that touch information of the first to third display devices 100, 200, and 300 are integrated, thereby allowing a multi-touch operation between the first to third display devices 100, 200, and 300.

The first display device 100 includes a display panel 110, a display controller 120 connected to the display panel 110, a touch controller 130, and a wireless transmitting/receiving unit 140.

A partial or entire region of the display panel 110 may be a touch active area TA capable of sensing the touch. The touch active area TA is an area capable of detecting a touch when an object approaches or touches the display panel 110. The touch may include when an external object approaches the display panel 110 or hovers around the display panel 110, and when the external object, such as a finger of a user, is in direct contact with the display panel 110.

Figure 2:
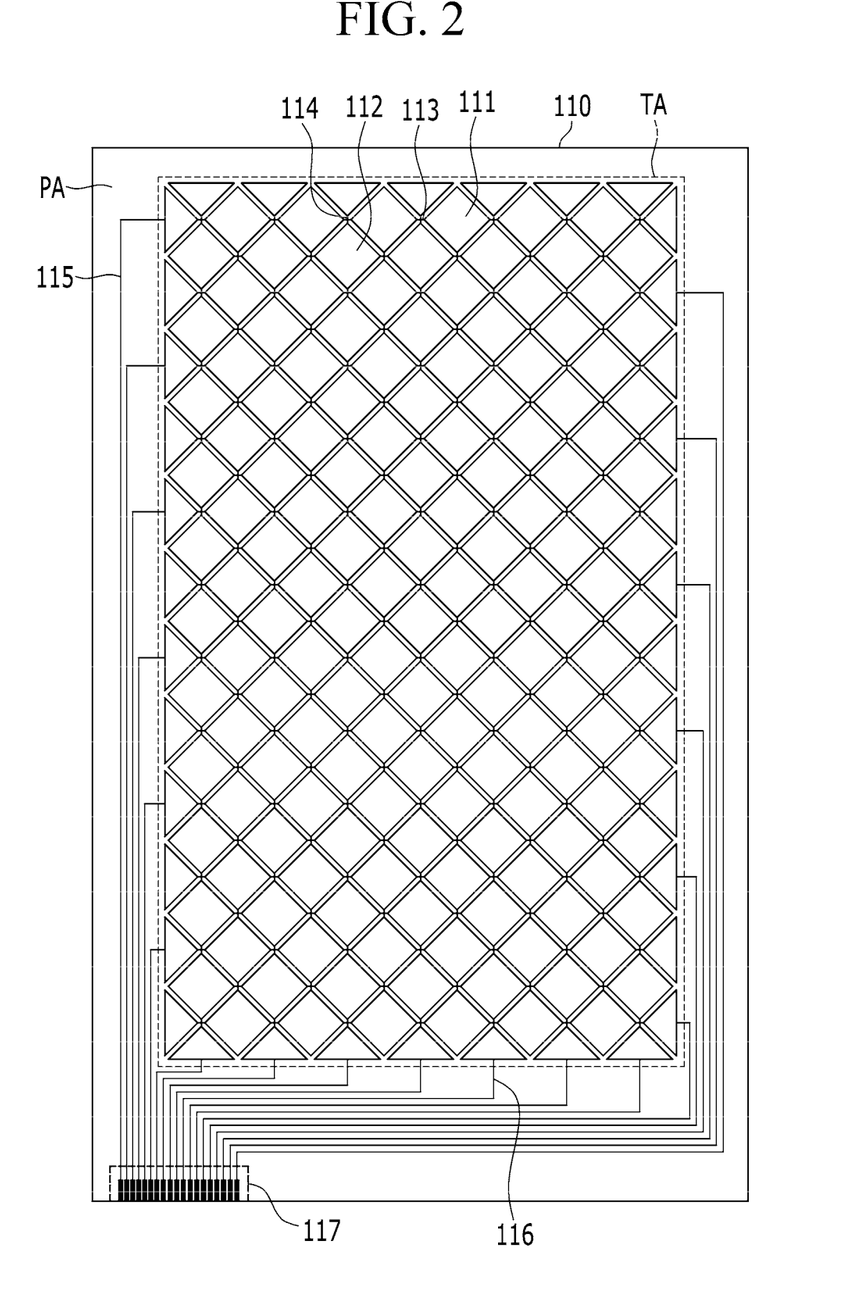
FIG. 2 is a view showing a touch sensing sensor of a touch screen panel according to an exemplary embodiment of the present invention.

FIG. 2 illustrates an example in which the entire display area DA is approximately the touch active area TA, however, a part of the peripheral area PA may be used as the touch active area TA, and only a part of the display area DA may serve as the touch active area TA.

Referring to FIG. 1, pixels PX and display signal lines (not illustrated) connected to the pixels PX, to transmit a driving signal, are positioned in the display area DA.

The display signal lines include scan signal lines (not illustrated) transmitting scan signals, and data lines (not illustrated) transmitting data signals. The scan signal lines and the data lines may extend while crossing each other. The display signal line may extend to the peripheral area PA to form a pad portion (not illustrated).

The pixels PX may be approximately arranged in a matrix type. Each pixel PX may include a switching element (not illustrated) connected with the gate line and the data line, and a pixel electrode (not illustrated) connected to the switching element. The switching element may be a three-terminal element, such as a thin-film transistor, integrated on the display panel 110. The switching element is turned on or turned off according to the gate signal transmitted by the gate line, to selectively transmit the data signal transmitted by the data line to the pixel electrode. The pixel PX may further include an opposed electrode (not illustrated) opposite to the pixel electrode. In the case of an organic light emitting diode display, an emission layer may be positioned between the pixel electrode and the opposed electrode to form a light emitting diode. The opposed electrode may transmit a common voltage.

In order to implement a color display, each pixel PX may display one of primary colors, and a desired color is recognized from a sum of the primary colors. Examples of the primary color may include three primary colors, such as red, green, and blue, or four primary colors. Each pixel PX may further include a color filter positioned at a place corresponding to each pixel electrode and transmitting one of the primary colors, and the emission layer included in the light emitting diode may emit colored light.

A touch detecting sensor is positioned in the touch active area TA. The touch detecting sensor may detect a touch by various methods. For example, the touch detecting sensor may be classified based on various types, such as a resistive type, a capacitive type, an electro-magnetic (EM) type, and an optical type. In the present exemplary embodiment, the capacitive type touch detecting sensor will be described as an example.

FIG. 2 is a view showing a touch sensing sensor of a touch screen panel according to an exemplary embodiment of the present invention.

Referring to FIG. 2, the touch detecting sensor according to the present exemplary embodiment includes touch electrodes, and the touch electrodes may include first touch electrodes 111 and second touch electrodes 112. The first touch electrode 111 and the second touch electrode 112 are separated from each other.

Referring to FIG. 2, the first touch electrodes 111 and the second touch electrodes 112 are alternately dispersed and disposed in the touch active area TA, so as not to overlap each other. The first touch electrodes 111 may be disposed in a column direction and a row direction, and the second touch electrodes 112 may also be disposed in the column direction and the row direction.

The first touch electrode 111 and the second touch electrode 112 may be positioned on the same layer.

A shape of each of the first touch electrode 111 and the second touch electrode 112 may be a quadrangle or may have various forms, such as having a protrusion, in order to improve sensitivity of the touch detecting sensor.

The first touch electrodes 111 arranged in the same row or column may be connected with or separated from each other inside or outside the touch active area TA. Similarly, at least a part of the second touch electrodes 112 arranged in the same column or row may be connected with or separated from each other inside or outside the touch active area TA. For example, when the first touch electrodes 111 arranged in the same row is connected with each other inside the touch active area TA as illustrated in FIG. 2, the second touch electrodes 112 arranged in the same column may be connected with each other inside the touch active area TA.

More particularly, the first touch electrodes 111 positioned in each row may be connected with each other through a first connection part 113, and the second touch electrodes 112 positioned in each column may be connected with each other through a second connection part 114.

The first touch electrodes 111 connected to each other in each row are connected to the touch controller 130 through a first touch wiring 115, and the second touch electrodes 112 connected to each other in each column are connected to the touch controller 130 through a second touch wiring 116. As shown in FIG. 2, the first touch wiring 115 and the second touch wiring 116 may be positioned in the peripheral area PA of the display panel 110, however the first and second touch wirings 115 and 116 may be positioned in the touch active region TA.

End portions of the first touch wiring 115 and the second touch wiring 116 form a pad portion 117 in the peripheral area PA of the display panel 110.

The first touch electrode 111 and the second touch electrode 112 may have a predetermined transmittance or higher, so that light may pass through the display panel 110. For example, the first touch electrode 111 and the second touch electrode 112 may be formed of a transparent conductive material, such as a thin metal layer including indium tin oxide (ITO), indium zinc oxide (IZO), and silver nanowire (AgNw), metal mesh, and carbon nanotube (CNT).

The first touch wiring 115 and the second touch wiring 116 may include the transparent conductive material included in the first touch electrode 111 and the second touch electrode 112, or a low resistance material, such as molybdenum (Mo), silver (Ag), titanium (Ti), copper (Cu), aluminum (Al), and molybdenum/aluminum/molybdenum (Mo/Al/Mo).

The first touch electrode 111 and the second touch electrode 112, which are adjacent to each other, form a mutual sensing capacitor serving as the touch detecting sensor. The mutual sensing capacitor may receive a detection input signal through one of the first touch electrode 111 and the second touch electrode 112, and output a change in an amount of charge due to a touch of an external object to the other touch electrode as a detection output signal.

According to an exemplary embodiment of the present invention, the first touch electrodes 111 and the second touch electrodes 112 may be separated from each other and respectively connected with the touch controller 130 through touch wirings (not illustrated). In this case, each touch electrode may form a self sensing capacitor as the touch detecting sensor. The self sensing capacitor may receive the detection input signal and be charged with a predetermined charge amount, and when an external object, such as a finger, touches the self sensing capacitor, a charged charge amount is changed, so that the self sensing capacitor may output a detection output signal different from the input detection input signal.

Referring back to FIG. 1, the display controller 120 controls an image display operation of the display panel 110.

More particularly, the display controller 120 receives an input image signal containing luminance information about each pixel PX and an input control signal controlling a display of the input image signal from the outside. The display controller 120 processes the input image signal based on the input control signal to convert the processed input image signal to an output image signal, and generates a control signal, such as a gate control signal and a data control signal. The display controller 120 transmits the gate control signal to a gate driver (not illustrated), and transmits the data control signal and the output image signal to a data driver (not illustrated). Meanwhile, the display controller 120 according to the present exemplary embodiment receives the image signal and the input control signal from a display processor 420 of the set board 400.

Although not illustrated, the data driver receives the output image signals for the pixels PX of one row according to the data control signal, selects a grayscale voltage corresponding to each of the output image signals, converts the output image signals to data voltages, and then applies the converted data voltages to corresponding data lines. The gate driver turns on the switching element connected with the gate line by applying a gate-on voltage to the gate line according to the gate control signal. Then, the data voltage applied to the data line is applied to the corresponding pixel PX through the turned-on switching element. When the data voltage is applied to the pixel PX, the pixel PX may display luminance corresponding to the data voltage through various optical conversion devices, such as a light emitting diode.

The touch controller 130 is connected with the touch detecting sensor positioned in the touch active area to control an operation of the touch detecting sensor. The touch controller 130 may transmit the detection input signal to the touch detecting sensor, or receive and process the detection output signal. The touch controller 130 may generate touch information, such as whether the touch is generated and the touch position, by processing the detection output signal. Also, the touch controller 130 collects and manages touch relation information of the second display device 200 and the third display device 300 through the wireless transmitting/receiving unit 140, which will be described in detail with reference to FIG. 3 and FIG. 4.

The driving devices, such as the data driver, the gate driver, and the display controller 120, may be directly mounted on the display panel 110 in a form of at least one integrated circuit chip, mounted on a flexible printed circuit film (not illustrated) to be attached to the display panel 110 in a form of a tape carrier package (TCP), or mounted on a separate printed circuit board (PCB) (not illustrated). Alternatively, the driving device may be integrated with the display panel 110 together with the display signal lines, the switching element, and the like.

The touch controller 130 may also be directly mounted onto the display panel 110 in a form of at least one integrated circuit chip, mounted on a flexible printed circuit film to be attached onto the display panel 110 in a form of a TCP, or mounted on a separate PCB. The touch controller 130 may be connected with the first touch wiring 115 and the second touch wiring 116 through the pad portion 117 of the display panel 110.

The display panel 110 may be formed on a substrate of a transparent insulating substrate including glass, quartz, ceramic, and plastic.

The first display device 100 according to the present exemplary embodiment includes the wireless transmitting/receiving unit 140. The wireless transmitting/receiving unit 140 has a function of transmitting/receiving the data through the second and third display devices 200 and 300 and a wireless interface. The wireless interface may be a short distance wireless communication interface such as WiDi, WiFi, or Zigbee. The wireless transmitting/receiving unit 140 may include an antenna for the wireless communication and is connected to the touch controller 130 and the display controller 120.

The display controller 120, the touch controller 130, and the wireless transmitting/receiving unit 140 included in the first display device 100 perform a master function in the tiled display device and may be commonly referred to as a master controller 150.

As shown in FIG. 1, the second display device 200 also includes a display panel 210, a display controller 220, a touch controller 230, and a wireless transmitting/receiving unit 240.

The display panel 210, the display controller 220, and the touch controller 230 respectively perform the same function as the display panel 110, the display controller 120, and the touch controller 130 of the first display device 100, and repeated description thereof will be omitted. Also, the wireless transmitting/receiving unit 240 performs the same function as the wireless transmitting/receiving unit 140 of the first display device 100, and the wireless transmitting/receiving unit 240 may transmit and receive the data through the wireless transmitting/receiving unit 140 and the wireless interface.

However, the display controller 220, the touch controller 230, and the wireless transmitting/receiving unit 240 perform a slave function in the tiled display device and may be commonly referred to as a first slave controller 250.

As shown in FIG. 1, the third display device 300 also includes a display panel 310, a display controller 320, a touch controller 330, and a wireless transmitting/receiving unit 340.

Each constituent elements of the third display device 300 performs the same function as each constituent elements of the second display device 200, and repeated description thereof will be omitted.

The display controller 320, the touch controller 330, and the wireless transmitting/receiving unit 340 perform the slave function in the tiled display device and may be commonly referred to as a second slave controller 350.

The set board 400 manages and controls the entire tiled display device and includes a touch processor 410 and a display processor 420.

The touch processor 410 receives the touch relation information collected by the touch controller 130 of the master controller 150 and controls the touch relation information of the entire tiled display device using the collected touch relation information.

The display processor 420 controls the first to third display devices 100, 200, and 300 to display the image data to the first to third display devices 100, 200, and 300. The display processor 420 receives the touch relation information from the touch processor 410 to control the display for the image signal corresponding to the touch relation information. In this case, the display processor 420 transmits the image to be displayed in the first to third display devices 100, 200, and 300 to the display controller 120 and the display controller 120 controls the display of the corresponding image to be displayed to the first display device 100. Also, the display controller 120 transmits the corresponding image to be displayed in the second and third display devices 200 and 300 through the wireless transmitting/receiving unit 140.

The set board 400 may be installed to be separated from the first to third display devices 100, 200, and 300, and the set board 400 may be installed inside the first display device 100.

By transmitting and receiving the signal through the wireless interface by the display devices 100, 200, and 300 of the tiled display device, a latency time may exist between the display devices 100, 200, and 300, which may cause a problem for synchronization of the display devices 100, 200, and 300. A method of preventing generation of the latency time in the synchronization process will be described with reference to FIG. 3 and FIG. 4.

Figure 3:
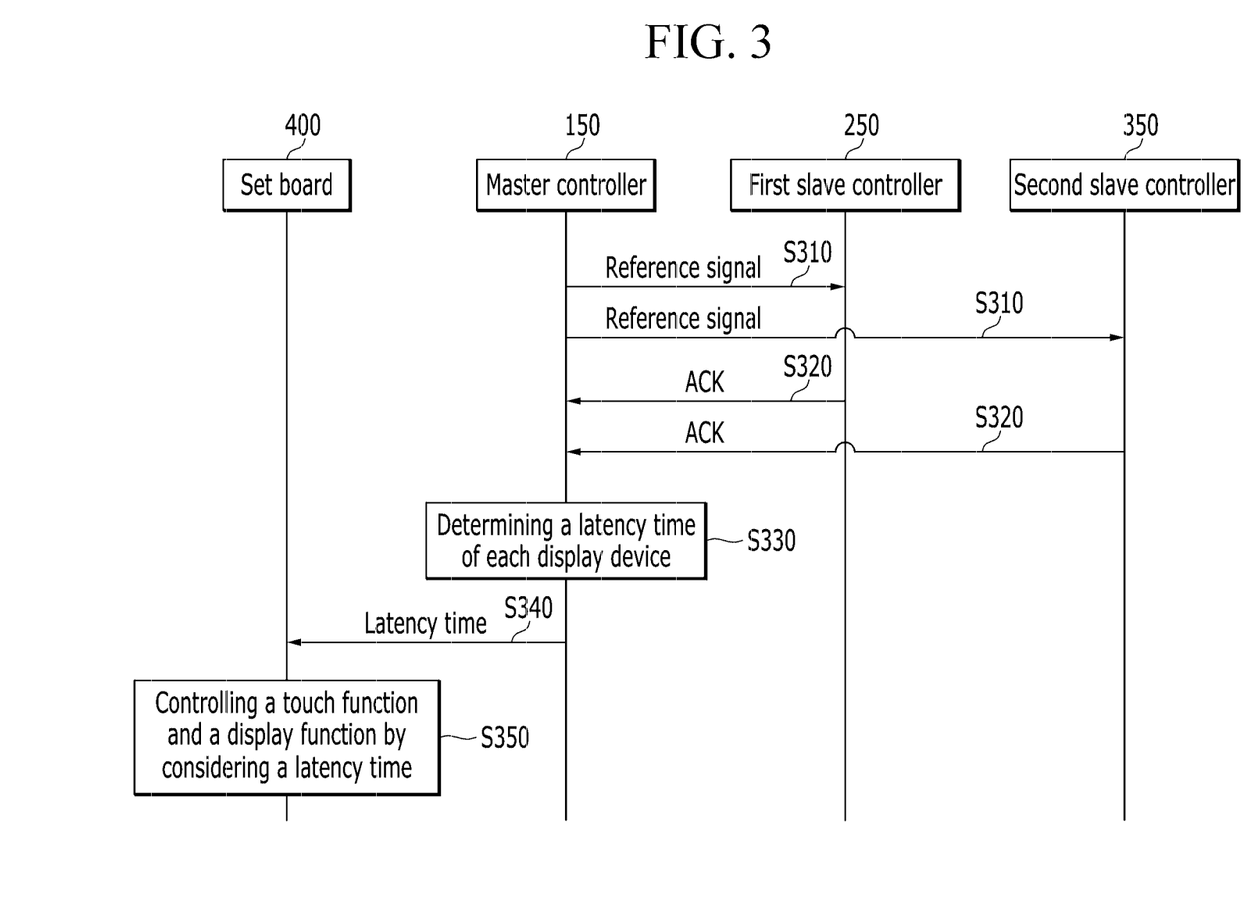
FIG. 3 is a view showing a synchronization method of a tiled display device according to an exemplary embodiment of the present invention.

FIG. 3 is a view showing a synchronization method of a tiled display device according to an exemplary embodiment of the present invention.

First, the master controller 150 transmits a reference signal to measure the latency time to the first slave controller 250 and the second slave controller 350 (S310). Here, the reference signal may be a pilot signal and is transmitted and received through the wireless transmitting/receiving units 140, 240, and 340 of each display device.

The first slave controller 250 directly transmits an acknowledge (ACK) signal to the master controller 150 after receiving the reference signal (S320). The second slave controller 350 also directly transmits the ACK signal to the master controller 150 after receiving the reference signal (S330).

The master controller 150 determines the latency time of the second display device 200 by using the ACK signal transmitted from the first slave controller 250 (S330). Also, the master controller 150 determines the latency time of the third display device 300 by using the ACK signal transmitted from the second slave controller 350 (S330). The master controller 150 performs a master function such that the latency time of the first display device 100 is determined as 0.

For example, when it takes 20 ms to receive the ACK signal from the first slave controller 250 after the master controller 150 transmits the reference signal, the master controller 150 determines the latency time of the second display device 200 as 10 ms. When it takes 22 ms to receive the ACK signal from the second slave controller 350 after the master controller 150 transmits the reference signal, the master controller 150 determines the latency time of the third display device 300 as 11 ms.

The master controller 150 transmits the latency time of each display device to the set board 400 (S340). Specifically, the touch controller 130 of the master controller 150 transmits each determined latency time to the touch processor 410 of the set board 400.

The set board 400 controls the touch function and the display function of the tiled display device in consideration of the transmitted latency time (S350). Specifically, the touch processor 410 of the set board 400 receives each latency time from the touch controller 130 and synchronizes the touch information transmitted from the first to third display devices 100, 200, and 300 in consideration of the transmitted latency time. More particularly, the touch processor 410 may synchronize the touch information transmitted from each display device 100, 200, and 300 in consideration of the latency time, thereby simultaneously determining the touch information.

The touch processor 410 determines the touch information considering the latency time and then requests the display function corresponding to the touch information from the display processor 420. In addition, the touch processor 410 also transmits the latency time of each display device 100, 200, and 300 to the display processor 420. In this case, the display processor 420 controls the display devices 100, 200, and 300 in consideration of each latency time of the display devices 100, 200, and 300, to simultaneously execute the display function to the display devices 100, 200, and 300. For example, the display processor 420 controls the image signal corresponding to the display function to be transmitted, in the order of the third display device 300, the second display device 200, and the first display device 100 in consideration of each latency time. The image signal may be displayed to the display devices 100, 200, and 300 through the display controller 120, and the second and third display devices 200 and 300 receive the corresponding image signal through the wireless interface.

According to the present exemplary embodiment, the touch information between the display devices of the tiled display device are synchronized, and the display operations corresponding to the touch information may be simultaneously displayed to each display device.

Figure 4:
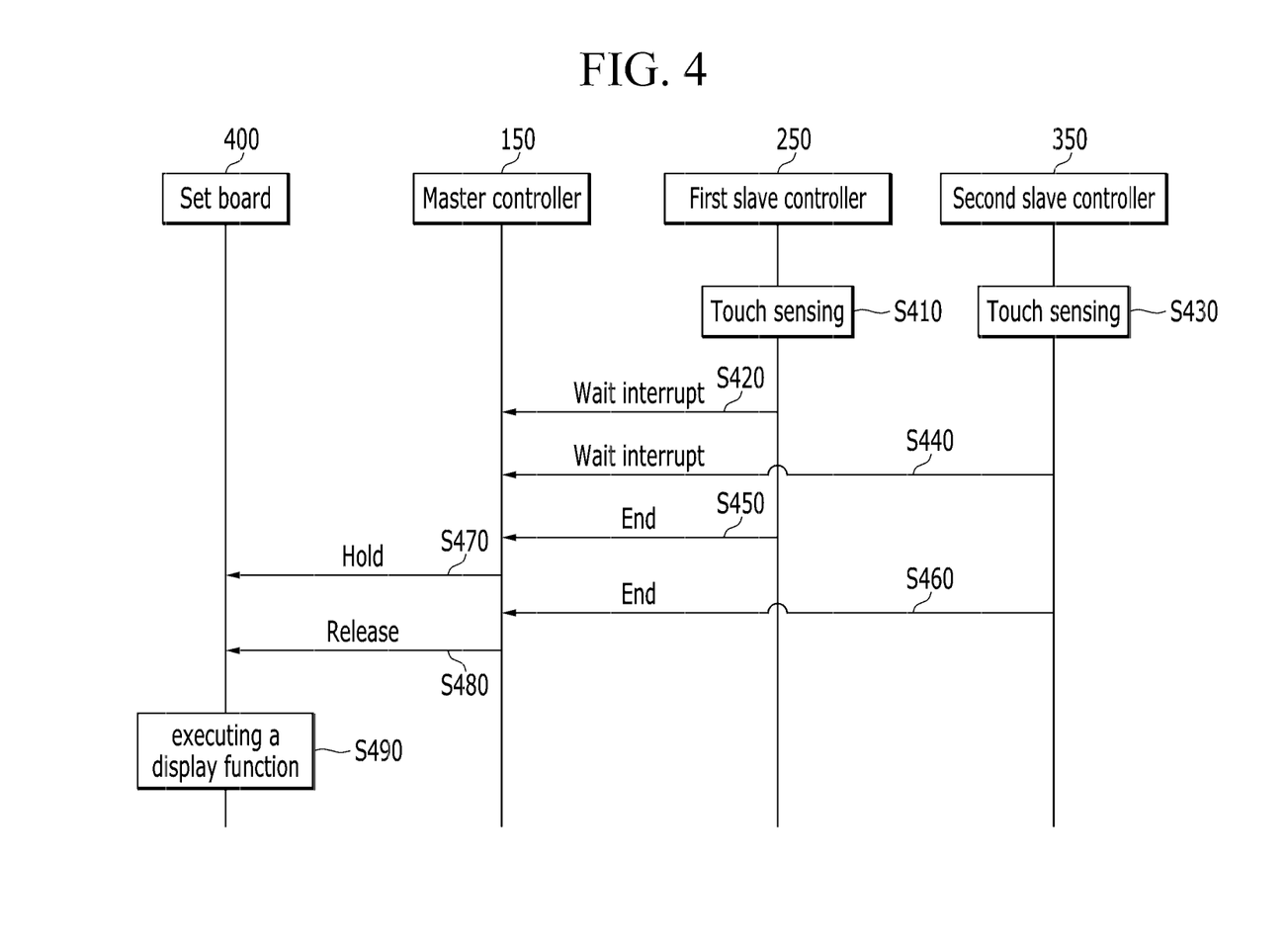
FIG. 4 is a view showing a synchronization method of a tiled display device according to an exemplary embodiment of the present invention.

FIG. 4 is a view showing a synchronization method of a tiled display device according to an exemplary embodiment of the present invention.

When a touch sensing information is input from the display panel 210, the first slave controller 250 transmits a wait interrupt signal to the master controller 150 (S410 and S420). More particularly, the first slave controller 250 directly transmits the wait interrupt signal to the display panel 210 of the second display device 200 at the time the touch function is executed. Also, the first slave controller 250 transmits the touch sensing information to the master controller 150 after transmitting the wait interrupt signal.

When the first slave controller 250 finishes transmitting the touch sensing information to the master controller 150, an end signal is transmitted to the master controller 150 (S450).

When the touch sensing information is input from the display panel 310, the second slave controller 350 also transmits the wait interrupt signal to the master controller 150 (S430 and S440). Also, the second slave controller 350 transmits the touch sensing information to the master controller 150 after transmitting the wait interrupt signal.

When transmitting the touch sensing information to the master controller 150 is finished, the second slave controller 350 transmits the end signal to the master controller 150 (S460).

When the end signal is transmitted from the first and second slave controllers 250 and 350, the master controller 150 transmits a hold signal to the set board 400 (S470). When the set board 400 does not receive the hold signal from the master controller 150, the display function corresponding to the touch sensing information is not executed.

When the master controller 150 receives the end signal from the first and second slave controllers 250 and 350, a release signal is transmitted to the set board 400 (S480).

When the set board 400 receives the release signal from the master controller 150, the display function corresponding to the touch information is executed (S490). Specifically, when the release signal is transmitted from the master controller 150, the touch processor 410 of the set board 400 informs such to the display processor 420. In this case, the display processor 420 controls the display function corresponding to the touch sensing information to be displayed to the display devices 100, 200, and 300.

According to the present exemplary embodiment, by performing the display operation after receiving the touch information of all of the display devices 100, 200, and 300, the touch information of the display devices 100, 200, and 300 may be synchronized.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A method for synchronizing a tiled display device comprising first, second, and third display devices and displaying an image signal in connection with the first, second, and third display devices, the method comprising:
   receiving a first interrupt signal from the second display device when a first touch signal is detected in the second display device;
   receiving a second interrupt signal from the third display device when a second touch signal is detected in the third display device;
   receiving a first end signal from the second display device, when the first touch signal has ended;
   receiving a second end signal from the third display device, when the second touch signal has ended; and
   displaying an image corresponding to the first and second touch signals when receiving the first end signal and the second end signal.

2. The method of claim 1, wherein the first touch signal and the second touch signal are a part of a multi-touch operation.

3. The method of claim 1, wherein the image corresponding to the first and second touch signals is not displayed when at least one of the first and second end signals is not received.

4. The method of claim 1, wherein the first display device is a master display device and the second and third display devices are slave display devices.

5. The method of claim 1, wherein the first, second, and third display devices are connected to each other through a wireless interface.

6. A tiled display device, comprising:
   a first display unit;
   a second display unit; and
   a third display unit,
   wherein:
   the first display unit is connected to the second display unit and the third display unit;
   the first display unit, the second display unit, and the third display unit each comprises a display panel configured to sense a touch thereon; and
   the first display unit is configured to receive a first interrupt signal from the second display unit when a first touch signal is detected in the second display unit, receive a second interrupt signal from the third display unit when a second touch signal is detected in the third display unit, receive a first end signal from the second display unit when the first touch signal has ended, receive a second end signal from the third display unit when the second touch signal has ended, and display an image corresponding to the first and second touch signals when receiving the first end signal and the second end signal.

7. The tiled display device of claim 6, wherein the first touch signal and the second touch signal are a part of a multi-touch operation.

8. The tiled display device of claim 6, wherein the image corresponding to the first and second touch signals is not displayed when at least one of the first and second end signals is not received.

9. The tiled display device of claim 6, wherein the first display unit is a master and the second and third display units are slave.

10. The tiled display device of claim 6, wherein the first, second, and third display units are connected to each other through a wireless interface.

* * * * *